US007281868B2

(12) United States Patent
Kido et al.

(10) Patent No.: US 7,281,868 B2
(45) Date of Patent: Oct. 16, 2007

(54) HEAT DEVELOPING APPARATUS AND HEAT DEVELOPING METHOD

(75) Inventors: Kazuhiro Kido, Hino (JP); Suguru Kamio, Kokubunji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/263,868

(22) Filed: Nov. 2, 2005

(65) Prior Publication Data

US 2006/0099537 A1 May 11, 2006

(30) Foreign Application Priority Data

| | | |
|---|---|---|
| Nov. 5, 2004 | (JP) | 2004-322120 |
| Nov. 5, 2004 | (JP) | 2004-322121 |
| Dec. 22, 2004 | (JP) | 2004-371256 |

(51) Int. Cl.
*G03B 13/00* (2006.01)
*G03C 5/16* (2006.01)

(52) U.S. Cl. .......... 396/575; 430/350

(58) Field of Classification Search .......... 396/575; 430/348, 350

See application file for complete search history.

(56) References Cited

U.S. PATENT DOCUMENTS

| | | | | |
|---|---|---|---|---|
| 6,312,170 | B1 * | 11/2001 | Agano | 396/575 |
| 6,320,642 | B1 * | 11/2001 | Ogawa et al. | 355/27 |
| 7,112,402 | B2 * | 9/2006 | Yoshioka et al. | 430/619 |

FOREIGN PATENT DOCUMENTS

| | | |
|---|---|---|
| JP | 2000-284456 A | 10/2000 |
| JP | 2004-212565 A | 7/2004 |
| JP | 2004-219795 A | 8/2004 |

* cited by examiner

*Primary Examiner*—Alan Mathews
(74) *Attorney, Agent, or Firm*—Finnegan, Henderson, Farabow, Garrett & Dunner, L.L.P.

(57) ABSTRACT

The heat developing apparatus heats and conveys a film with a heat developing photosensitive material coated on one side of a supporting substrate and makes a latent image formed on the film visible, which includes a first zone composed of stationary guides 51*b* and 52*b* having a heater and opposing rollers 51*a* and 52*a* for pressing the film against the stationary guides and a second zone 53 composed of a stationary guide 53*b* having a heater and another guide 53*a* forming a predetermined guide gap with the stationary guide, wherein the guide gap of the second zone is 3 mm or less.

5 Claims, 10 Drawing Sheets

EXAMPLE 1

COMPARATIVE EXAMPLE 1

COMPARATIVE EXAMPLE 3

COMPARATIVE EXAMPLE 2

HEAT DEVELOPING APPARATUS AND HEAT DEVELOPING METHOD

This application is based on Japanese Patent Application Nos. 2004-322120, 2004-322121 filed on Nov. 5, 2004 and 2004-371256 filed on Dec. 22, 2004 in Japanese Patent Office, the entire content of which is hereby incorporated by reference.

BACKGROUND OF THE INVENTION

The present invention relates to a heat developing method and a heat developing apparatus for performing a rapid process of heating and successively cooling a sheet film on which a heat developing photosensitive material is coated.

Patent Document 1 indicated below discloses a heat developing apparatus for sliding and heating a sheet film on the EC surface (emulsion coated surface) side between a heated drum having a flexible layer and a plurality of opposing rollers, thereby developing the film with a latent image formed. Patent Document 2 indicated below discloses a heat developing apparatus of a method of using a fixed heater divided into three parts instead of the heating drum aforementioned and sliding and heating the BC surface (supporting substrate surface) side of a film on the heater. Furthermore, Patent Document 3 indicated below discloses a heat developing apparatus for passing and heating a film through a slit formed on the outer periphery of a drum. Further, Patent Document 4 indicated below discloses a miniaturized dry-type image processor for continuously executing exposure, development, and cooling and especially performing the exposure process and heating process simultaneously.

Even in a comparatively large-sized apparatus as described in Patent Documents 1 to 3 and even in a small-sized apparatus as described in Patent Document 4, a heating method uniform in the film conveyance direction is adopted. The former apparatus can realize a uniform image quality by the uniform heating method and the large quantity processing ability. However, in the latter half in the heating step, the apparatus heats and conveys films with excessive accuracy, thus a decrease in cost by miniaturization and reduction in the number of parts cannot be expected, and on the other hand, in the latter apparatus, neither a rapid process nor uniform heating, that is, uniform density can be expected. Furthermore, in a conventional heat developing apparatus, the heat developing time is generally 14 seconds or so (a length of 17 inches in the conveyance direction), but realization of a rapid heat developing process is required. However, in theses Patent Documents, no measures for the rapid heat developing process are suggested and disclosed.

Patent Document 1: Japanese Patent Application Tokuhyou No. hei 10-500497

Patent Document 2: Japanese Patent Application Tokkai No. hei 2003-287862

Patent Document 3: U.S. Pat. No. 3,739,143

Patent Document 4: Japanese Patent Application Tokkai No. hei 2002-162692

SUMMARY OF THE INVENTION

In consideration of the problems of the prior arts mentioned above, an object of the present invention is to provide a heat developing apparatus which can speed up the heat developing process while maintaining the image quality equal to that of a conventional large-sized apparatus and can realize miniaturization and decreasing in cost. The present invention is also intended to provide a heat developing method and a heat developing apparatus, when executing the heat developing process by a rapid process of 10 seconds or less, for stabilizing the density and making the image quality stable.

To accomplish the above object, the inventors, as a result of examination and research, have obtained the knowledge that the heat developing process is composed of a temperature raising step of heating a film up to the heat developing temperature by the heat developing process and a temperature retaining step of retaining the temperature of the film, and in the former temperature raising step, uniform heating to overall the film (in other words, close contact on heat transfer between the film and the heating member) is important. The inventors have further obtained the knowledge that unless the uniform heating is guaranteed, uneven heating (that is, uneven density) is caused easily, and at the latter temperature retaining step, close contact between the heating member and the film is not so important compared with the former. Furthermore, the inventors have obtained the knowledge that if the heating time of a sheet film having a formed latent image is 14 seconds or so, when heating from the emulsion coated surface side (hereinafter, referred to as EC side) or even when heating from the back coated surface side (hereinafter, referred to as BC side), the solvent components (MEK, moisture, etc.) contained in the emulsion are almost volatilized off (evaporated), so that the image quality (density) is stabilized. On the other hand, the inventors have also obtained the knowledge that in the rapid process for shortening the heating time, between when heating of the EC side and when heating of the BC side, a difference appears in the density.

Furthermore, by the examination of the inventors, the knowledge is obtained that when the EC side of a sheet film is opened to air and the sheet film is heated from the BC side, a difference hardly appears in the density, and the density is stabilized.

The present invention was accomplished on the basis of such knowledge and the heat developing apparatus of the present invention is a heat developing apparatus for heating and conveying a sheet film with a heat developing photosensitive material coated on one side of a supporting substrate and making a latent image formed on the sheet film visible, which includes a first zone composed of a stationary guide having a heater and opposing rollers for pressing a sheet film against the stationary guide and a second zone composed of a stationary guide having a heater and another guide forming a predetermined guide gap for the stationary guide, wherein the guide gap of the second zone is 3 mm or less.

According to the heat developing apparatus, in the first zone, the close contact between the heating device such as the heating member and the sheet film is ensured, and the sheet film is raised in temperature, and an occurrence of uneven density is suppressed, and in the second zone there is no need to realize such close contact so that the temperature of the sheet film is retained in the guide gap, thus by maintaining the high image quality free from uneven density, the rapid process of the heat developing process, miniaturization of the apparatus, and a decrease in cost can be realized. When the guide gap is 3 mm or less, in the second zone, regardless of the conveyance posture of the sheet film with respect to both guides, the temperature retaining performance is affected little, and the arrangement accuracy between the stationary guide and another guide is not required so much, and the tolerances to curvature accuracy when both guides are manufactured and the mounting accuracy are increased, thus the degree of freedom of design is increased greatly, and it can contribute to a decrease in the cost of the apparatus.

In the heat developing apparatus aforementioned, the guide gap in the second zone is preferably within the range from 1 mm to 3 mm. When the guide gap is 1 mm or more, the part of the sheet film where a heat developing photosensitive material is coated hardly touches the guide surface and the possibility of occurrence of scratches is preferably lowered.

Further, the stationary guide in the second zone and the aforementioned guide have preferably almost the same curvature. When the guide in the second zone is given a curvature to miniaturize the apparatus, a guide having an almost fixed guide gap can be formed.

Further, it is preferable to structure the apparatus so as to control the engaging time with the sheet film in the first and second zones to 10 seconds or less.

Next, the effect of opening of the EC side (opening of the EC surface) of a sheet film to air and heating of the BC side (heating of the BC surface) will be explained by referring to FIGS. 11(*a*) and (*b*). FIG. 11(*a*) is a drawing schematically showing the situation of opening of the EC side (opening of the EC surface) of the sheet film to air and heating of the BC side (heating of the BC surface). FIG. 11(*b*) is a drawing schematically showing, for comparison, the situation of opening of the BC side (opening of the BC surface) of the sheet film to air and heating of the EC side (heating of the EC surface).

(A) Stability of the Density and Stability of the Sensitocurve (γ Curve)

When many films are stacked and set in the apparatus, the films absorb moisture from the uppermost film, the lowermost film, and the film edges of the four peripheries of the stacked films due to the environmental humidity and volatilize the residual solvents therein. Therefore, between the surfaces of the stacked films and in each surface thereof, the contents of the solvents (moisture, organic solvent) become non-uniform. Such non-uniformity of the solvent contents between the film surfaces remains in the films after heating, and due to the non-uniformity, a density difference appears between prints in one day and between days, and as the processing speed is increased, the density differences are apt to become more remarkable. However, in the rapid process (the heating time is shortened) method of the present invention by opening the EC side to air, the solvent components are volatilized uniformly in a short time, so that the density difference hardly appears. As a result, the density is stabilized, and the sensitocurve (γ curve) is also stabilized, resulting in a stable density gradation.

(B) Uniformity of the Density (1)

When many films are stacked and set in the apparatus, the films absorb moisture from the uppermost film, the lowermost film, and the film edges of the four peripheries of the stacked films due to the environmental humidity and volatilize the residual solvents therein. Therefore, between the surfaces of the stacked films and in the surfaces thereof, the contents of the solvents (moisture, organic solvent) become non-uniform. In the four peripheries of the films, the solvent contents are apt to become non-uniform, and a density difference of the film appears, and uneven density is generated. However, by the rapid process (the heating time is shortened) by opening the EC side of the present invention, the solvent components are uniformly volatilized from overall the films, thus the density difference of the film hardly appears.

(C) Uniformity of the Density (2)

Even if the contact (heat conductivity) between the film (substrate of PET) and the heating body (heater) gets worse partially, the PET base performs the relaxation action of uneven heat transfer, so that the occurrence of uneven density can be suppressed.

In a case of opening of the EC surface and heating of the BC surface shown in FIG. 11(*a*), the EC surface of the sheet film is opened to air, so that the solvents (moisture, organic solvent) are volatilized from overall the film, and the density is lowered. However at the parts F1 and F2 where the contact between the film and the heating body (heater) is not enough partially, the volatilization amount is reduced relatively, and the density reduction amount is reduced. On the other hand, the temperature is hardly increased relatively, and the development progress is suppressed, resulting in a low density. These offset each other, so that a density difference from the place of good contact hardly appears. As a result, uneven density becomes advantageous for the uniformity of the film.

On the other hand, in a case of opening of the BC surface and heating of the EC surface shown in FIG. 11(*b*), from the parts F3 and F4 where the contact between the film and the heating body (heater) is not enough partially, the solvents (moisture, organic solvent) are volatilized and the density is lowered, and on the other hand, at the parts F3 and F4 where the contact between the film and the heating body (heater) is not enough partially, the temperature is hardly increased, and the development progress is suppressed, and the density is lowered. By the synergistic effect thereof, a density difference from the place of good contact becomes notable. As a result, uneven density becomes disadvantageous for uniformity of the film.

The present invention was accomplished on the basis of the aforementioned knowledge of the inventors and the heat developing method of the present invention is a heat developing method for heating a sheet film with a heat developing photosensitive material coated on one side of a supporting substrate for a heating time of 10 seconds or less and then cooling it, which is characterized in that it opens the surface side of the sheet film where the heat developing photosensitive material is coated and heats the sheet film from the supporting substrate surface side.

According to the heat developing method, when executing the heat developing process by the rapid process of 10 seconds or less, the surface side where the heat developing photosensitive material is coated is opened to air, and the sheet film is heated from the supporting substrate surface side, thus the solvents (moisture, organic solvent, etc.) contained in the sheet film which are heated and intended to volatilize (evaporate) are scattered at the shortest distance, so that even if the heating time (volatilization time) is shortened, the sheet film is hardly affected by the shortened time, and even if there is a part where the contact between the film and the heater is not enough, a density difference from the part where the contact is satisfactory hardly appears, so that the density can be stabilized, and the image quality becomes stable.

In the heat developing method aforementioned, the heating step includes a temperature raising step of heating the sheet film up to a heat developing temperature and a temperature retaining step of retaining the temperature of the sheet film heated to the heat developing temperature, thus uneven density is more hardly generated.

The heat developing apparatus of the present invention is a heat developing apparatus for heating a sheet film with a heat developing photosensitive material coated on one side of a supporting substrate for a heating time of 10 seconds or less by a heating device and then cooling it by a cooling device, which is characterized in that the heating device is structured so as to open the surface side of the sheet film where the heat developing photosensitive material is coated and heat the sheet film from the supporting substrate surface side.

According to the heat developing apparatus, when executing the heat developing process by the rapid process of 10 seconds or less, the surface side where the heat developing photosensitive material is coated is opened to air, and the sheet film is heated from the supporting substrate surface side, thus the solvents (moisture, organic solvent, etc.) contained in the sheet film which are heated and are intended to volatilize (evaporate) are scattered at the shortest distance, so that even if the heating time (volatilization time) is shortened, the sheet film is hardly affected by the shortened time, and even if there is a part where the contact between the film and the heater is not enough, a density difference from the part where the contact is satisfactory hardly appears, so that the density can be stabilized, and the image quality becomes stable.

In the heat developing apparatus aforementioned, the heating device is structured so as to execute the temperature raising step of heating the sheet film up to the heat developing temperature and the temperature retaining step of retaining the temperature of the sheet film heated to the heat developing temperature, thus uneven density is more hardly generated.

According to the heat developing apparatus and heat developing method of the present invention, the heat developing process can be speeded up while maintaining the image quality equal to that of a conventional large-sized apparatus and miniaturization and decreasing in cost can be realized. Namely, when executing the heat developing process by the rapid process of 10 seconds or less, the density can be stabilized and the image quality can be made stable.

BRIEF DESCRIPTION OF THE DRAWINGS

FIG. 11(*b*) is a drawing schematically showing, for comparison, the situation of opening of the BC side (opening of the BC surface) of the sheet film to air and heating of the EC side (heating of the EC surface).

DETAILED DESCRIPTION OF THE PREFERRED EMBODIMENTS

Hereinafter, the preferred embodiments for execution of the present invention will be explained with reference to the accompanying drawings.

First Embodiment

Figure 1:
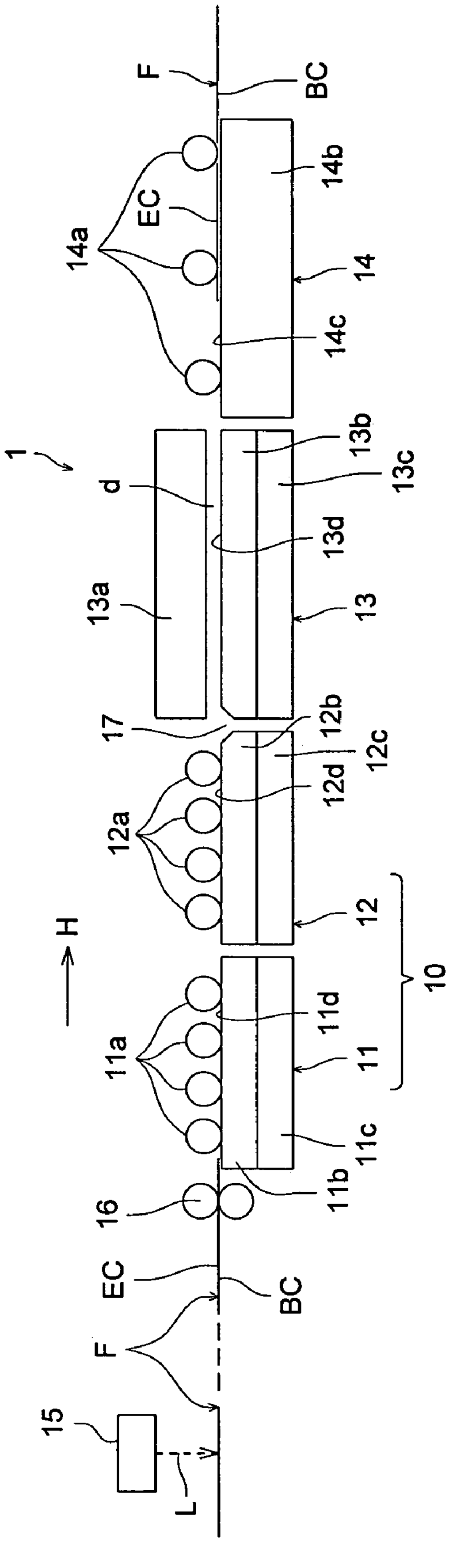
FIG. 1 is a front view schematically showing the main section of the heat developing apparatus of the first embodiment.

FIG. 1 is a front view schematically showing the main section of the heat developing apparatus of the first embodiment. As shown in FIG. 1, a heat developing apparatus 1 of the first embodiment, while carrying out sub-scanning conveyance, in the direction H, of a sheet film F (hereinafter, referred to as a film) having an EC surface where a heat developing photosensitive material is coated on one side of a sheet formed supporting substrate made of PET or the like and a BC surface on the opposite surface of the EC surface on the supporting substrate side, scans a laser beam L for exposure by an light scanning exposure section 15 on the basis of image data, thereby forms a latent image on the EC surface, then heats to develop the film F from the BC surface side, and makes the latent image visible.

The heat developing apparatus 1 shown in FIG. 1 includes a temperature raising section 10 for heating the film F having the formed latent image, from the BC surface side and heating it up to a predetermined heat developing temperature, a temperature retaining section 13 for heating the temperature-raised film F and retaining it at the predetermined heat developing temperature, and a cooling section 14 for cooling the heated film F from the BC surface side. The temperature raising section 10 and the temperature retaining section 13 compose a heating section, which heats the film F up to the heat developing temperature and retains it at the heat developing temperature.

The temperature raising section 10 has a first heating zone 11 for heating the film F on the upstream side and a second heating zone 12 for heating it on the downstream side.

The first heating zone 11 includes a fixed flat heating guide 11*b* made of a metallic material such as aluminum, a flat heater 11*c* composed of a silicon rubber heater or the like adhered to the rear of the heating guide 11*b,* and a plurality of opposing rollers 11*a* having a surface composed of silicon rubber having heat insulation quality better than metal, which is arranged so as to keep a narrower gap than the film thickness in order to press the film against a stationary guide surface 11*d* of the heating guide 11*b*.

The second heating zone 12 includes a fixed flat heating guide 12_b_ made of a metallic material such as aluminum, a flat heater 12_c_ composed of a silicon rubber heater or the like adhered to the rear of the heating guide 12_b,_ and a plurality of opposing rollers 12_a_ having a surface composed of silicone rubber having heat insulation quality better than metal which is arranged so as to keep a narrower gap than the film thickness in order to press the film against a stationary guide surface 12_d_ of the heating guide 12_b_.

The temperature retaining section 13 includes a fixed flat heating guide 13_b_ made of a metallic material such as aluminum, a flat heater 13_c_ composed of a silicon rubber heater or the like adhered to the rear of the heating guide 13_b,_ and a guide section 13_a_ composed of a heat insulator arranged opposite to a stationary guide surface 13_d_ formed on the surface of the heating guide 13_b_ so as to have a predetermined gap (slit) d.

In the first heating zone 11 of the temperature raising section 10, the film F conveyed by a pair of conveying rollers 16 from the upstream side of the temperature raising section 10 is pressed against the stationary guide face 11_d_ by the respective opposing rollers 11_a_ driven to rotate, thus the BC surface makes close contact with the stationary guide face 11_d_ and is conveyed in the direction H while being heated.

Similarly in the second heating zone 12, the film F conveyed from the first heating zone 11 is pressed against the stationary guide face 12_d_ by the respective opposing rollers 12_a_ driven to rotate, thus the BC surface makes close contact with the stationary guide face 11_d_ and is conveyed in the direction H while being heated.

Between the second heating zone 12 of the temperature raising section 10 and the temperature retaining section 13, a concavity 17 opened upward in a V shape is installed and is structured so that foreign substances from the temperature raising section 10 fall into the concavity 17. By means of this, foreign substances from the temperature raising section 10 are prevented from being carried in the temperature retaining section 13 and the film F can be prevented from an occurrence of jamming, scratching, and uneven density.

In the temperature retaining section 13, the film F conveyed from the second heating zone 12, while being heated (heat retained) by the heat from the heating guide 13_b_ in the gap "d" between the stationary guide face 13_d_ of the heating guide 13_b_ and the guide section 13_a,_ passes through the gap "d" by the conveying force of the opposing rollers 12_a_ on the side of the second heating zone 12. The gap "d" is preferably within the range from 1 to 3 mm.

In the cooling section 14, the film F makes contact with a cooling guide face 14_c_ of a cooling plate 14_b_ made of a metallic material or the like and is conveyed further in the direction H by opposing rollers 14_a_ while being cooled. Further, when the cooling plate 14_b_ is formed as a finned heat sink structure, the cooling effect can be increased. A cooling plate of a finned heat sink structure may be arranged additionally on the downstream side of the cooling plate 14_b_.

As mentioned above, in the heat developing apparatus 1 shown in FIG. 1, the film F is conveyed when the BC face is directed toward the stationary guide surfaces 11_d,_ 12_d,_ and 13_d_ in the heated state in the temperature raising section 10 and the temperature retaining section 13 and the EC surface with the heat developing photosensitive material coated is opened to air. Further, in the cooling section 14, as shown in FIG. 1, the film F is conveyed when the BC face makes contact with the cooling guide surface 14_c_ and is cooled and the EC surface with the heat developing material coated is opened to air.

Further, the film F is conveyed by the opposing rollers 11_a_ and 12_a_ so that the passing time through the temperature raising section 10 and the temperature retaining section 13 becomes 10 seconds or less. Therefore, the heating time for temperature rise and temperature retaining is set to 10 seconds or less.

As mentioned above, according to the heat developing apparatus 1 shown in FIG. 1, in the temperature raising section 10 requiring uniform heat transfer, the film F is adhered to the stationary guide surfaces 11_d_ and 12_d_ by the heating guides 11_b_ and 12_b_ and the plurality of opposing rollers 11_a_ and 12_a_ for pressing the film F against the heating guides 11_b_ and 12_b,_ thus the film F is conveyed while ensuring contact for heat transfer. Therefore, overall the film is heated uniformly and is uniformly raised in temperature, thus the finished film forms a high-quality image with an occurrence of uneven density suppressed.

Further, after temperature rise to the heat developing temperature, even if in the temperature retaining section 13 the film is conveyed into the gap "d" between the stationary guide surface 13_d_ of the heating guide 13_b_ and the guide section 13_a,_ and the temperature retaining section 13 heats (the film directly makes contact with the stationary guide surface 13_d_ and is heated by heat transfer and/or heat transfer by contact with surrounding high temperature air) in the gap "d" without particularly being adhered to the stationary guide surface 13_d,_ the film temperature is controlled within a predetermined range (for example, 0.5° C.) of the development temperature (for example, 123° C.). As mentioned above, even if the film is conveyed in the gap "d" along the wall face of the heating guide 13_b_ or the wall face of the guide section 13_a,_ a difference in the film temperature is less than 0.5° C. and a uniform temperature retaining state can be kept, so that there is little possibility of an occurrence of uneven density on the finished film. Therefore, there is no need to install drive parts such as rollers in the temperature retaining section 13, thus the number of parts can be reduced.

Furthermore, the heating time for the film F is sufficiently 10 seconds or less, so that a rapid heat developing process can be realized, and the film conveyance path linearly extended from the temperature raising section 10 to the cooling section 14 can be changed according to the apparatus layout, and miniaturization of the installation area and miniaturization of the overall apparatus can be realized.

In a conventional large-sized apparatus, for the part which can be operated sufficiently by only the temperature retaining function after the film temperature was raised to the development temperature, the same heating conveyance constitution as that of the temperature rising section was adopted, so that unnecessary members were used after all, and increasing in the number of parts and increasing in cost were caused. In a conventional small-sized apparatus, a problem arose that heat transfer at time of temperature rise could be hardly guaranteed, so that uneven density was generated, and high image quality could be hardly guaranteed. On the other hand, according to the first embodiment, the heat developing process is executed separately in the temperature raising section 10 and the temperature retaining section 13, thus the problems aforementioned can be solved.

Further, the film F is heated from the BC surface side by the temperature raising section 10 and the temperature retaining section 13 while the EC surface with the heat developing photosensitive material coated is opened to air, thus when executing the heat developing process by the rapid process of 10 seconds or less, by opening the EC surface side, the solvents (moisture, organic solvent, etc.) contained in the film F which are heated and intended to volatilize (evaporate) are scattered at the shortest distance, so that even if the heating time (volatilization time) is shortened, the sheet film is hardly affected by the shortened time, and even if there is a part where the contact between the film F and the stationary guide surfaces 11*d* and 12*d* is not enough, by the heat diffusion effect by the PET base of the BC surface, a temperature difference from the part where the contact is satisfactory is relaxed, and as a result, a density difference hardly appears, so that the density can be stabilized, and the image quality becomes stable. Further, generally, in consideration of the heating efficiency, heating of the EC surface side is considered to be better. However, in consideration of that the thermal conductivity of the PET of the supporting substrate of the film F is 17 W/m ° C. and the thickness of the PET base is about 170 μm, the time delay is little, and it can be offset easily by increasing the heater capacity, and therefore the aforementioned effect of relaxing uneven contact is more expected preferably.

Furthermore, between the temperature retaining section 13 and the cooling section 14, the solvents (moisture, organic solvent, etc.) contained in the film F are intended to volatilize (evaporate) because they are at a high temperature. The EC surface of the film F is opened in the cooling section 14, so that the solvents (moisture, organic solvent, etc.) are not trapped and are volatilized for a longer period of time, thus the image quality (density) is stabilized more. As mentioned above, in the rapid process, the cooling time cannot be ignored and it is particularly effective in the rapid process of a heating time of 10 seconds or less.

Second Embodiment

Figure 2:
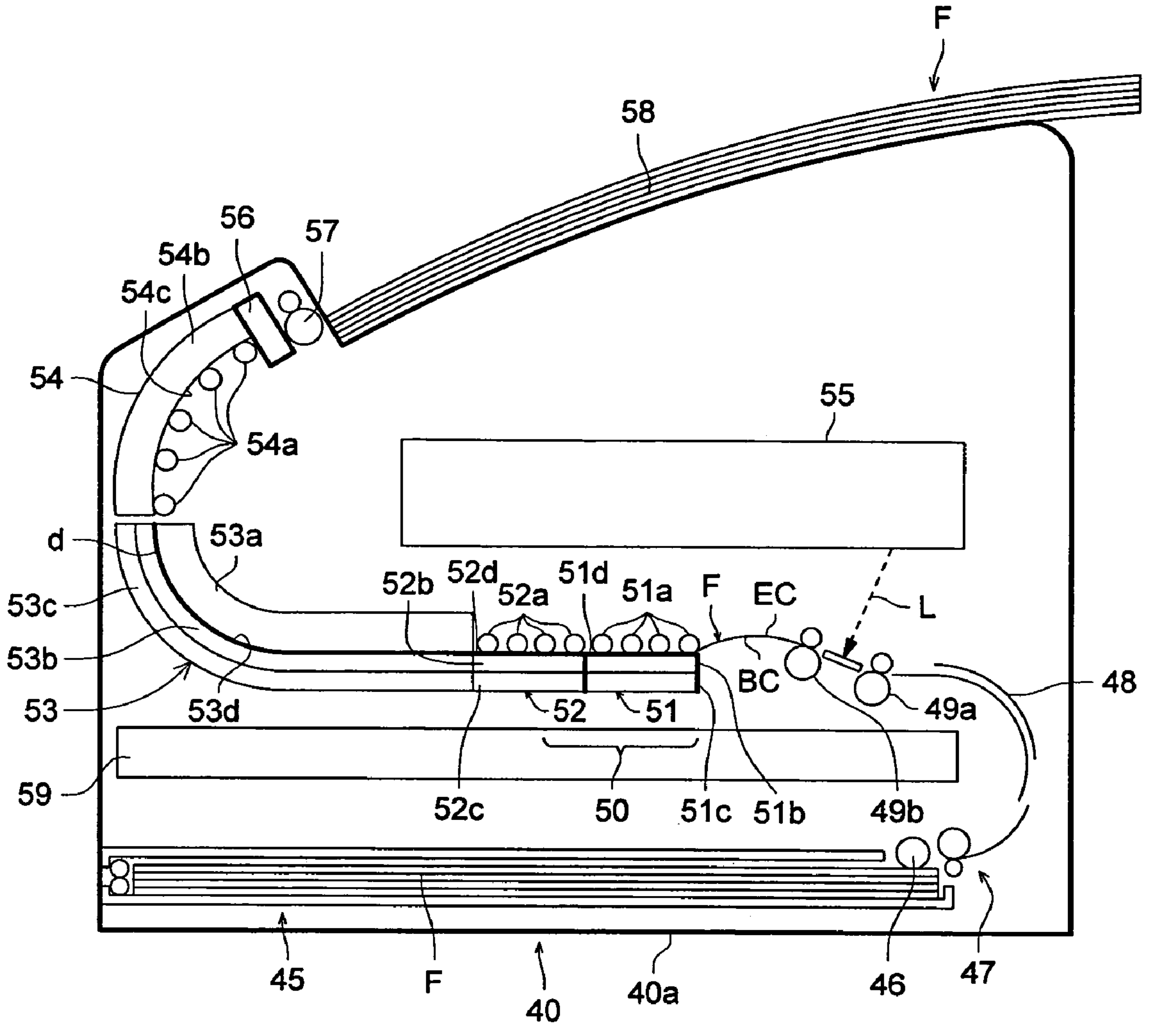
FIG. 2 is a front view schematically showing the main section of the heat developing apparatus of the second embodiment.

FIG. 2 is a front view schematically showing the main section of the heat developing apparatus of the second embodiment.

As shown in FIG. 2, a heat developing apparatus 40 of the second embodiment, similarly to the aforementioned, by carrying out sub-scanning conveyance of the sheet film F having the EC surface where the heat developing photosensitive material is coated on one side of the sheet-formed supporting substrate made of PET and the BC surface of the opposite face of the EC surface on the supporting substrate side, forms a latent image on the EC surface by a laser beam L from an optical scanning exposure section 55, then heats to develop the film F from the BC surface side, makes the latent image visible, and conveys and ejects it above the apparatus via the curved conveyance path.

The heat developing apparatus 40 shown in FIG. 2 includes a film storage section 45 for storing many unused films F installed in the neighborhood of the bottom of an apparatus frame 40*a*, a pickup roller 46 for picking up and conveying the uppermost film F in the film storage section 45, a pair of conveying rollers 47 for conveying the films F from the pickup roller 46, a curved guide 48 formed in a curved shape so as to guide the films F from the pair of conveying rollers 47 and convey them by almost inverting the conveyance direction, a pair of conveying rollers 49*a* and 49*b* for carrying out sub scanning conveyance of the films F from the curved guide 48, and an light scanning exposure section 55 for scanning a laser beam L to the films F for exposure between the pair of conveying rollers 49*a* and 49*b* on the basis of the image data, thereby forming a latent image on the EC surface.

The heat developing apparatus 40 additionally includes a temperature raising section 50 for heating the film F with the latent image formed, from the BC surface side and raising the temperature up to a predetermined heat developing temperature, a temperature retaining section 53 for heating the temperature-raised film F and retaining the film temperature at the predetermined heat developing temperature, a cooling section 54 for cooling the heated film F from the BC surface side, a densitometer 56 arranged on the exit side of the cooling section 54 for measuring the density of the film F, a pair of conveying rollers 57 for ejecting the film F from the densitometer 56, and a film receiving section 58 installed on the top of the apparatus frame 40*a* with a gradient so as to load the film F ejected by the pair of conveying rollers 57.

As shown in FIG. 2, in the heat developing apparatus 40, upward from the bottom of the apparatus frame 40*a*, the film storage section 45, control unit 59, conveying roller pair 49*a* and 49*b*, temperature raising section 50, and temperature retaining section 53 (on the upstream side) are arranged in this order, and the film storage section 45 is positioned lowest, and the control unit 59 is installed between the temperature raising section 50 and the temperature retaining section 53, so that the film storage section 45 is hardly affected by heat.

Further, the conveyance path from the pair of conveying rollers 49*a* and 49*b* for sub scanning conveyance to the temperature raising section 50 is formed comparatively short, so that while exposing the film F in the light scanning exposure section 55, on the front end side of the film F, the temperature raising section 50 and the temperature retaining section 53 carry out heat development heating.

The temperature raising section 50 and the temperature retaining section 53 compose a heating section, which heats the film F up to the heat developing temperature and retains it at the heat developing temperature. The temperature raising section 50 has a first heating zone 51 for heating the film F on the upstream side and a second heating zone 52 for heating it on the downstream side.

The first heating zone 51 includes a stationary flat heating guide 51*b* made of a metallic material such as aluminum, a flat heater 51*c* composed of a silicon rubber heater or the like adhered to the rear of the heating guide 51*b*, and a plurality of opposing rollers 51*a* having a surface composed of silicon rubber having heat insulation quality better than metal which is arranged so as to keep a narrower gap than the film thickness in order to press the film against a stationary guide face 51*d* of the heating guide 51*b*.

The second heating zone 52 includes a fixed flat heating guide 52*b* made of a metallic material such as aluminum, a flat heater 52*c* composed of a silicon rubber heater or the like adhered to the rear of the heating guide 52*b*, and a plurality of opposing rollers 52*a* having a surface composed of silicon rubber having heat insulation quality better than metal which is arranged so as to keep a narrower gap than the film thickness in order to press the film against a stationary guide face 52*d* of the heating guide 52*b*.

The temperature retaining section 53 includes a fixed heating guide 53*b* made of a metallic material such as aluminum, a flat heater 53*c* composed of a silicon rubber heater or the like adhered to the rear of the heating guide 53*b*, and a guide section 53*a* composed of a heat insulator which is arranged opposite to a stationary guide face 53*d* formed on the surface of the heating guide 53*b* so as to have a predetermined gap (slit) d. In the temperature retaining section 53, the part thereof on the side of the temperature raising section 50 is formed continuously and flatly with the second heating zone 52 and is formed in a curved shape at a predetermined curvature upward from the apparatus in the middle thereof.

The gap “d” is preferably within the range from 1 to 3 mm. In the temperature retaining section 53, the part thereof on the side of the temperature raising section 50 is formed continuously and flatly with the second heating zone 52 and is formed in the curved shape at the predetermined curvature upward from the apparatus in the middle thereof. The heating guide 53*b* and guide section 53*a* in the curved shape are formed almost at the same curvature.

In the first heating zone 51 of the temperature raising section 50, the film F conveyed by the pair of conveying rollers 49*a* and 49*b* from the upstream side of the temperature raising section 50 is pressed against the stationary guide surface 51*d* by the respective opposing rollers 51*a* driven to rotate, thus the BC surface makes close contact with the stationary guide surface 51*d,* and the film F is conveyed while being heated.

Similarly in the second heating zone 52, the film F conveyed from the first heating zone 51 is pressed against the stationary guide face 52*d* by the respective opposing rollers 52*a* driven to rotate, thus the BC surface makes close contact with the stationary guide face 51*d,* and the film F is conveyed while being heated.

Further, similarly to FIG. 1, between the second heating zone 52 of the temperature raising section 50 and the temperature retaining section 53, a concavity opened upward in a V shape may be installed and foreign substances from the temperature raising section 50 fall into the concavity, thus foreign substances from the temperature raising section 50 can be prevented from being carried in the temperature retaining section 53.

In the temperature retaining section 53, the film F conveyed from the second heating zone 52, while being heated (heat retained) by the heat from the heating guide 53*b* in the gap “d” between the stationary guide surface 53*d* of the heating guide 53*b* and the guide section 53*a,* passes through the gap “d” by the conveying force of the opposing rollers 52*a* on the side of the second heating zone 52. At this time, the film F is conveyed toward the cooling section 54 by gradually changing the direction from the horizontal direction to the vertical direction.

In the cooling section 54, the film F conveyed almost in the vertical direction from the temperature retaining section 53 is cooled by making contact with a cooling guide surface 14*c* of a cooling plate 54*b* made of a metallic material by opposing rollers 54*a* and is conveyed by gradually changing the direction thereof from the vertical direction to the oblique direction toward the film receiving section 58. Further, when the cooling plate 54*b* is formed as a finned heat sink structure, the cooling effect can be increased. A part of the cooling plate 54*b* may be formed as a finned heat sink structure.

The cooled film F sent from the cooling section 54 is measured for density by the densitometer 56, and conveyed by the pair of conveying rollers 57, and then ejected to the film receiving section 58. The film receiving section 58 can temporarily load a plurality of films F.

As mentioned above, in the heat developing apparatus 40 shown in FIG. 2, the film F is conveyed while the BC surface is directed toward the stationary guide surfaces 51*d,* 52*d,* and 53*d* in the heated state in the temperature raising section 50 and the temperature retaining section 53 and the EC surface where the heat developing photosensitive material is coated is opened to air. Further, in the cooling section 54, the film F is conveyed while the BC surface makes contact with the cooling guide face 54*c* and is cooled and the EC surface where the heat developing material is coated is opened to air.

Further, the film F is conveyed by the opposing rollers 51*a* and 52*a* so that the passing time through the temperature raising section 50 and the temperature retaining section 53 becomes 10 seconds or less. Therefore, the heating time for temperature raising and temperature retaining is set to 10 seconds or less.

As mentioned above, according to the heat developing apparatus 40 shown in FIG. 2, in the temperature raising section 50 requiring uniform heat transfer, the film F is adhered to the stationary guide surfaces 51*d* and 52*d* by the heating guides 51*b* and 52*b* and the plurality of opposing rollers 51*a* and 52*a* for pressing the film F against the heating guides 51*b* and 52*b,* thus the film F is conveyed while ensuring contact for heat transfer. Therefore, overall the film is heated uniformly and is uniformly raised in temperature, thus the finished film forms a high-quality image with an occurrence of uneven density suppressed.

Further, after temperature rise to the heat developing temperature, even if in the temperature retaining section 53 the film is conveyed into the gap “d” between the stationary guide surface 53*d* of the heating guide 53*b* and the guide section 53*a,* and the temperature retaining section 53 heats it (the film directly makes contact with the stationary guide surface 53*d* and is heated by heat transfer and/or heat transfer by contact with surrounding high temperature air) in the gap “d” without particularly being adhered to the stationary guide surface 53*d,* the film temperature is controlled within a predetermined range (for example, 0.5° C.) of the development temperature (for example, 123° C.). As mentioned above, even if the film is conveyed in the gap “d” along the wall face of the heating guide 53*b* or the wall face of the curved guide 53*a,* a difference in the film temperature is less than 0.5° C. and a uniform temperature retaining, state can be kept, so that there is little possibility of an occurrence of uneven density in the finished film. Therefore, there is no need to install drive parts such as rollers in the temperature retaining section 53, thus the number of parts can be reduced.

Furthermore, the heating time for the film F is sufficiently 10 seconds or less, so that a rapid heat developing process can be realized, and the temperature retaining section 53 extended horizontally from the temperature raising section 50 is structured so as to be formed in a curved shape in the middle thereof and be directed vertically, and the film F is almost inverted in the direction thereof in the cooling section 54 and is ejected to the film receiving section 58. Therefore, the cooling section 54 is formed at a predetermined curvature according to the apparatus layout, thus miniaturization of the installation area and miniaturization of the overall apparatus can be realized.

In a conventional large sized apparatus, for the part which can be operated sufficiently by only the temperature retaining function after the film temperature was raised to the development temperature, the same heating conveyance constitution as that of the temperature rising section was adopted, so that unnecessary members were used after all, and increasing in the number of parts and increasing in cost were caused. In a conventional small sized apparatus, a problem arose that heat transfer at time of temperature rise could be hardly guaranteed, so that uneven density is caused, and high image quality could be hardly guaranteed. On the other hand, according to the second embodiment, similarly to the first embodiment, the heat developing process is executed separately in the temperature raising section 50 and the temperature retaining section 53, thus the problems aforementioned can be solved.

Further, the film F is heated from the BC surface side in the temperature raising section 50 and the temperature retaining section 53 while the EC surface where the heat developing photosensitive material is coated is opened to air, thus when executing the heat developing process by the rapid process of 10 seconds or less, by opening the EC surface side, the solvents (moisture, organic solvent, etc.) contained in the film F which are heated and intended to volatilize (evaporate) are scattered at the shortest distance, so that even if the heating time (volatilization time) is shortened, the sheet film is hardly affected by the shortened time, and even if there is a part where the contact between the film F and the stationary guide surfaces 51*d* and 52*d* is not enough, by the heat diffusion effect by the PET base of the BC surface, a temperature difference from the part where the contact is satisfactory is relaxed, and as a result, a density difference hardly appears, so that the density can be stabilized, and the image quality becomes stable. Further, generally, in consideration of the heating efficiency, heating of the EC surface side is considered to be better. However, in consideration of that the thermal conductivity of the PET of the supporting substrate of the film F is 17 W/m ° C. and the thickness of the PET base is about 170 μm, the time delay is little, and it can be offset easily by increasing the heater capacity, and the aforementioned effect of relaxing uneven contact can be more expected preferably.

Furthermore, between the temperature retaining section 53 and the cooling section 54, the solvents (moisture, organic solvent, etc.) contained in the film F are intended to volatilize (evaporate) because they are at a high temperature. The EC surface of the film F is opened in the cooling section 54, so that the solvents (moisture, organic solvent, etc.) are not trapped and are volatilized for a longer period of time, thus the image quality is stabilized. As mentioned above, in the rapid process, the cooling time cannot be ignored and it is particularly effective in the rapid process of a heating time of 10 seconds or less.

Further, in FIGS. 1 and 2, when the guide gap "d" of the temperature retaining sections 13 and 53 is 3 mm or less, in the temperature retaining sections 13 and 53, regardless of the conveyance posture of the sheet film, the temperature retaining performance is affected little, and the arrangement accuracy between the heating guides 13*b* and 53*b* and the guides 13*a* and 53*a* opposite to them is not required so much, and the tolerances to curvature errors when both guides are manufactured and the mounting accuracy are increased, thus the degree of freedom of design is increased greatly, and it can contribute to a decrease in the cost of the apparatus. Further, when the guide gap "d"of the temperature retaining sections 13 and 53 is 1 mm or more, the EC surface of the film hardly touches the guide surface and the possibility of an occurrence of scratches is preferably lowered.

Figure 3:
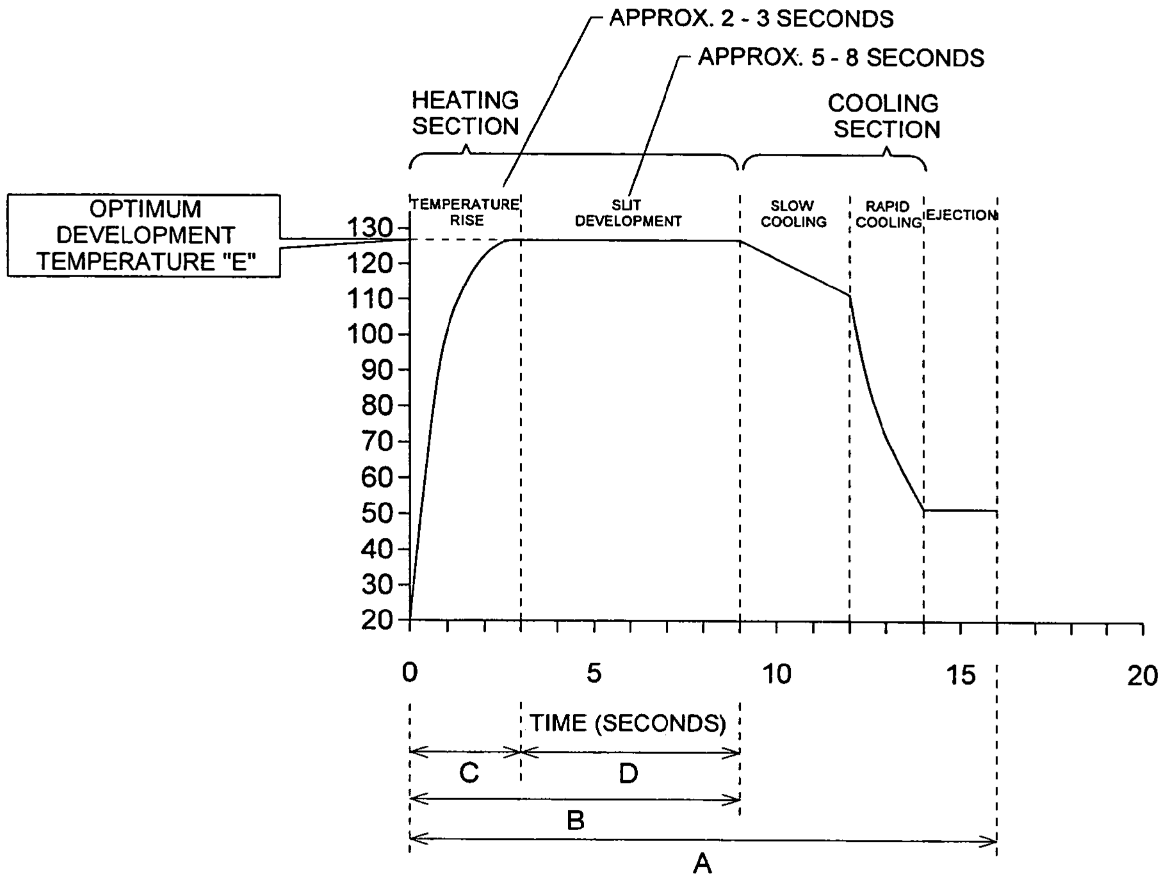
FIG. 3 is a graph showing the temperature profile by the rapid processing method of the heat developing process of the heat developing apparatuses 1 and 40 shown in FIGS. 1 and 2.

Next, the rapid process of the heat developing process in the first and second embodiments will be explained by referring to FIG. 3. FIG. 3 is a graph showing the temperature profile by the rapid processing method of the heat developing process of the heat developing apparatuses 1 and 40 shown in FIGS. 1 and 2.

The rapid processing method shortens more the heating time B, as shown in FIG. 3, to shorten the total processing time A of a film in the heat developing apparatuses 1 and 40 shown in FIGS. 1 and 2. Therefore, to shorten more the temperature raising time "C" up to the optimum development temperature "E", in the temperature raising sections 10 and 50, the film F is pressed by the opposing rollers 11*a,* 12*a,* 51*a,* and 52*a* and makes close contact with the stationary guide surfaces 11*d,* 12*d,* 51*d,* and 52*d* for rapid heat transfer from guide facing to the film.

And, after the temperature of film F reaches the optimum development temperature "E", in the temperature retaining sections 13 and 53, the film F is retained at the heat developing temperature for the temperature retaining time D. The temperature retaining sections 13 and 53, as described above, convey the film F in the gap (slit) "d" free of pressing by the opposing rollers and without close contact with the stationary guide surfaces 13*d* and 53*d.* Further, rapid cooling by the cooling section shown in FIG. 3 can be realized by arrangement of a heat sink and a cooling fan in the cooling sections 14 and 54.

As described above, in the state that the image quality is maintained, the heating time B (temperature rising time C+temperature retaining time D) can be shortened from conventional 14 seconds or so to 10 seconds or less, and the total processing time A can be shortened.

EXAMPLES

Example 1

Next, in Example 1, the effect of heating of the BC surface and opening of the EC surface in the heating process of the rapid process will be explained. The heat developing apparatus shown in FIG. 4 was used for experimentation and the constitution thereof is as indicated below.

As a heating system, a heating plate composed of an aluminum plate with a thickness of 10 mm having a silicon rubber heater attached on the rear thereof was used. On each guide surface of the heating plates, a silicon rubber roller with a diameter of 12 mm and an effective conveyance length of 380 mm having a silicon rubber layer with a thickness of 1 mm as a surface layer was arranged at a linear pressure of about 8 gf/cm, and a film with a heat developing photosensitive material coated was pressed by the silicon rubber rollers and was conveyed in the state that the BC surface was in contact with the heating plates. The conveyance lengths of the heating plate was 210 mm.

As a cooling system, first to third cooling plates was formed of an aluminum plate with a thickness of 10 mm, and the first and second cooling plates respectively had an installed silicon rubber heater, thus the cooling temperature could be controlled, and to the rear of the aluminum plate of the third cooling plate, a heat sink with a thickness of 0.7 mm, a height of 35 mm, and a depth of 390 mm having 21 fins arranged at a pitch of 4 mm was joined. On the first to third cooling plates, a silicon rubber roller with a diameter of 12 mm and an effective conveyance length of 380 mm having a silicon rubber layer with a thickness of 1 mm as a surface layer was arranged at a linear pressure of about 8 gf/cm and a film was conveyed while being pressed. The conveyance lengths of the first to third cooling plates were respectively 60 mm, 105 mm, and 105 mm.

The conveying speed, in the ordinary process, was set to 15.1 mm/s, and in the rapid process, was changed to 21.2 mm/s. The temperatures of the heating plate was set to 123° C., the temperature of the first cooling plate to 110° C., the temperature of the second cooling plate to 90° C., and the temperature of the third cooling plate was set to 30 to 60° C. Between the heating plates and between the heating plates and the cooling plates, a gap of 2 mm was provided to suppress heat movement between the plates.

The heat developing film was SD-P manufactured by Konica Minolta Co., Ltd., which was a heat developing film of the organic solvent system as disclosed in Japanese Patent Application Tokkai No. 2004-102263.

The aforementioned films were left in three environments such as normal humidity (25° C., 50% RH), high humidity (25° C., 80% RH), and low humidity (25° C., 20% RH) so as to get to fit them. (By doing this, the water content in the films was changed.)

Figure 4:
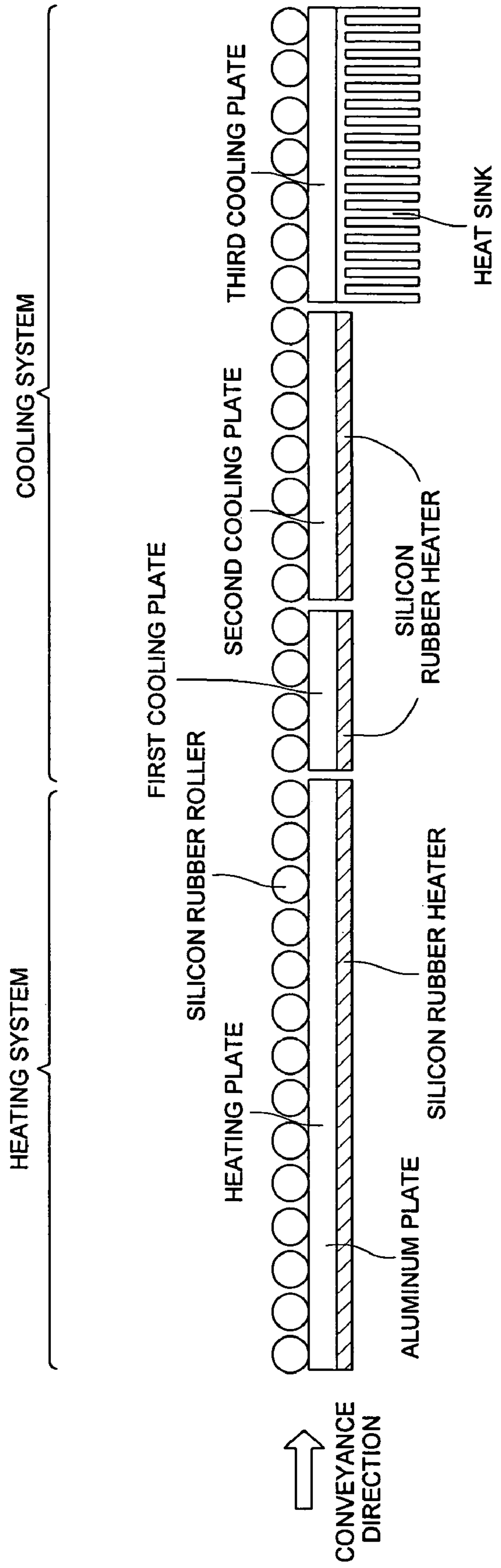
FIG. 4 is a front view showing the constitution of the main section of the heat developing apparatus used in Example 1.

Using these films, the heat developing process was executed in the heat developing apparatus shown in FIG. 4. Namely, in Example 1, the films were conveyed by opening the EC layer surface (EC surface) side with a coating liquid coated, pressing by the silicon rubber rollers, and making the BC surface contact with the heating plate, and the heating time B shown in FIG. 3 was set to 10 seconds, and the heat development was executed (EC surface opened, BC surface heated, rapid process).

In Comparative Example 1, under the same condition as that of Example 1 except that each film was turned upside down, and the BC surface side was opened, and the EC surface side was heated, the heat development was executed (BC surface opened, EC surface heated, rapid process).

In Comparative Example 2, under the same condition as that of Example 1 while the EC surface side was opened, and the BC surface side was heated except the ordinary process in which the heating time B was 14 seconds, the heat development was executed (EC surface opened, BC surface heated, ordinary process).

In Comparative Example 3, under the same condition as that of Example 1 except that the BC surface side was opened, and the EC surface side was heated, and the heating time B was 14 seconds as the ordinary process, the heat development was executed (BC surface opened, EC surface heated, ordinary process).

Figure 5:
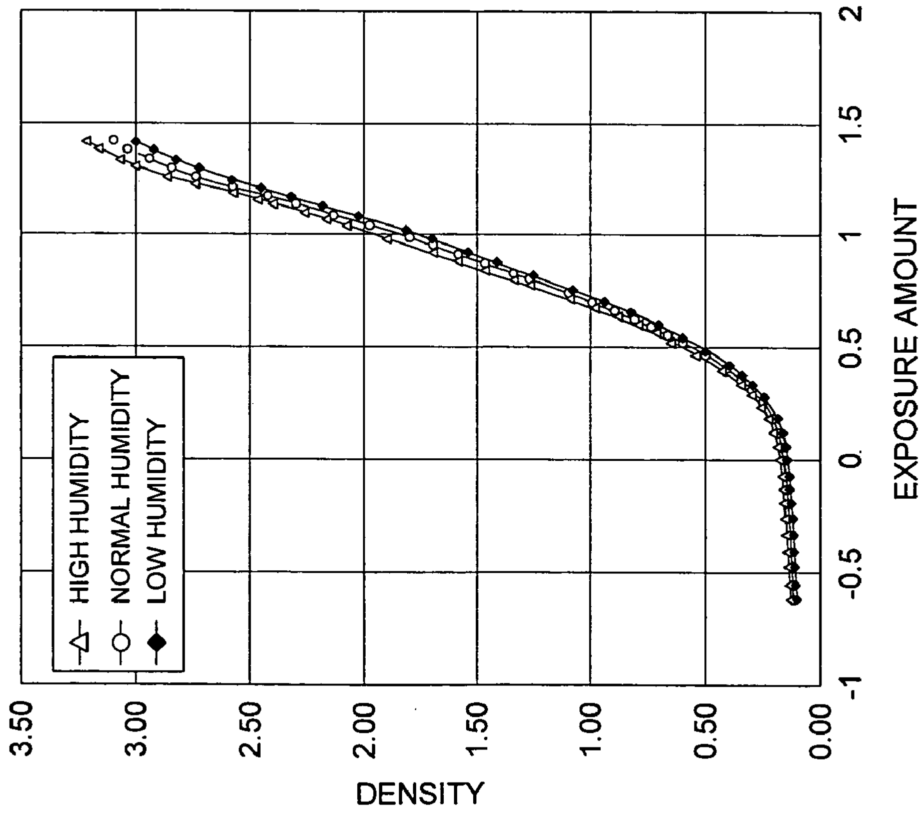
FIG. 5 is drawings showing the sensitocurve (γ curve) indicating the relationship between the exposure amount and the density of Example 1(a) and Comparative Example 1(b) of the rapid process.
Figure 5:
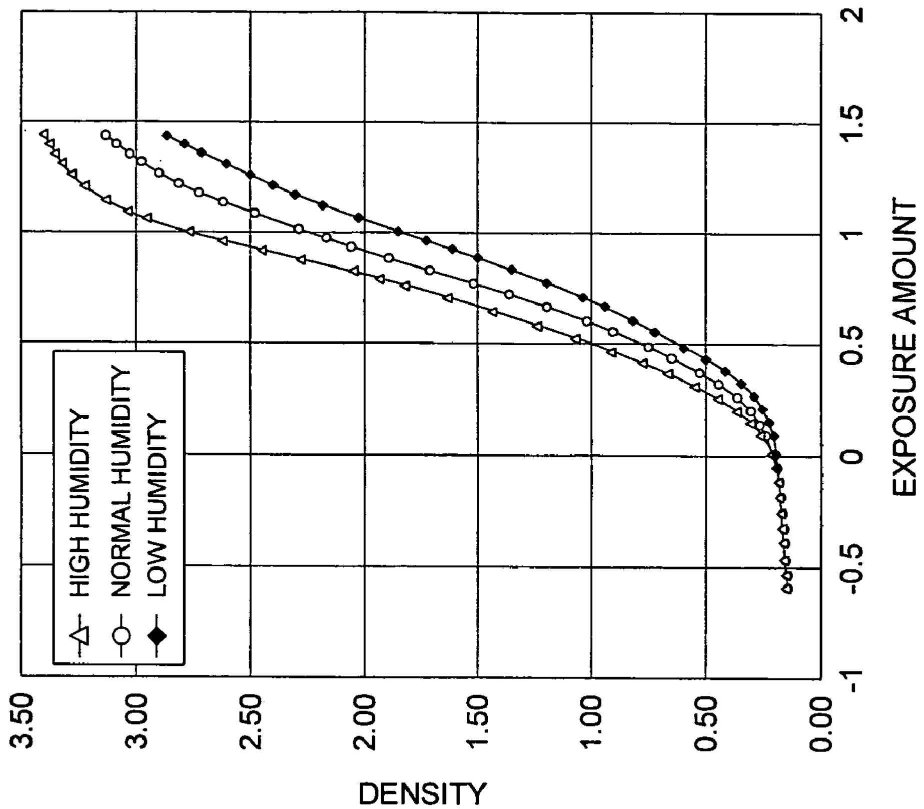
Figure 6:
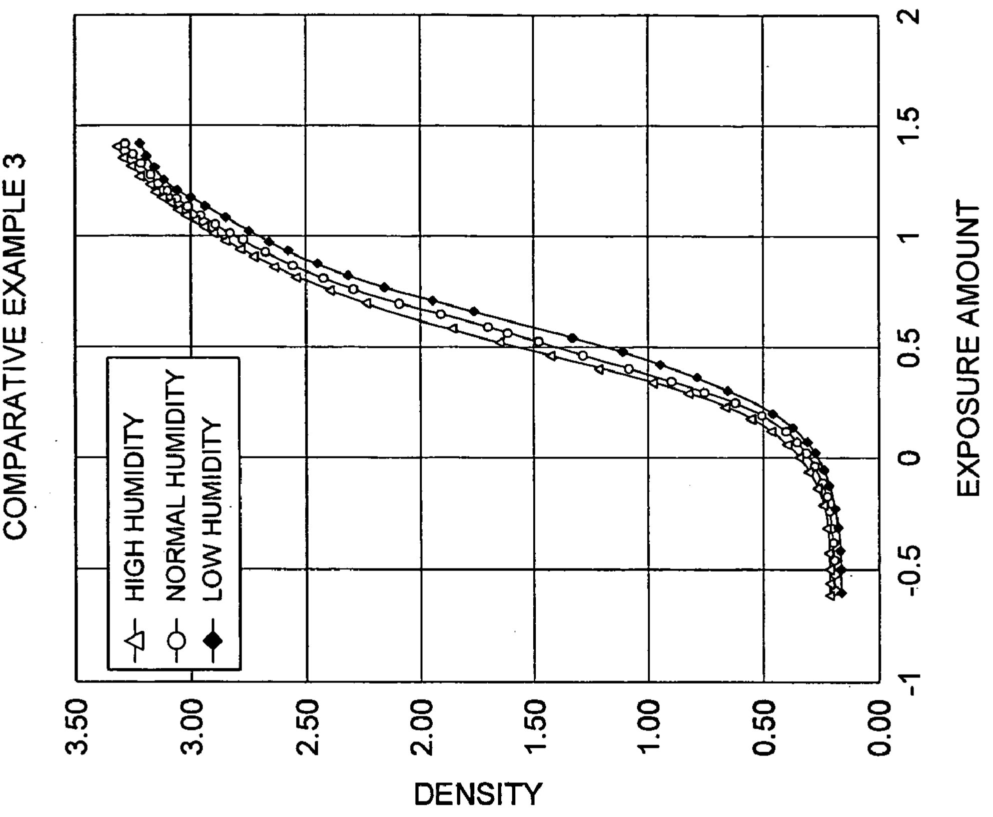
FIG. 6 is drawings showing the sensitocurve (γ curve) indicating the relationship between the exposure amount and the density of Comparative Example 2(a) and Comparative Example 3(b) of the ordinary process.
Figure 6:
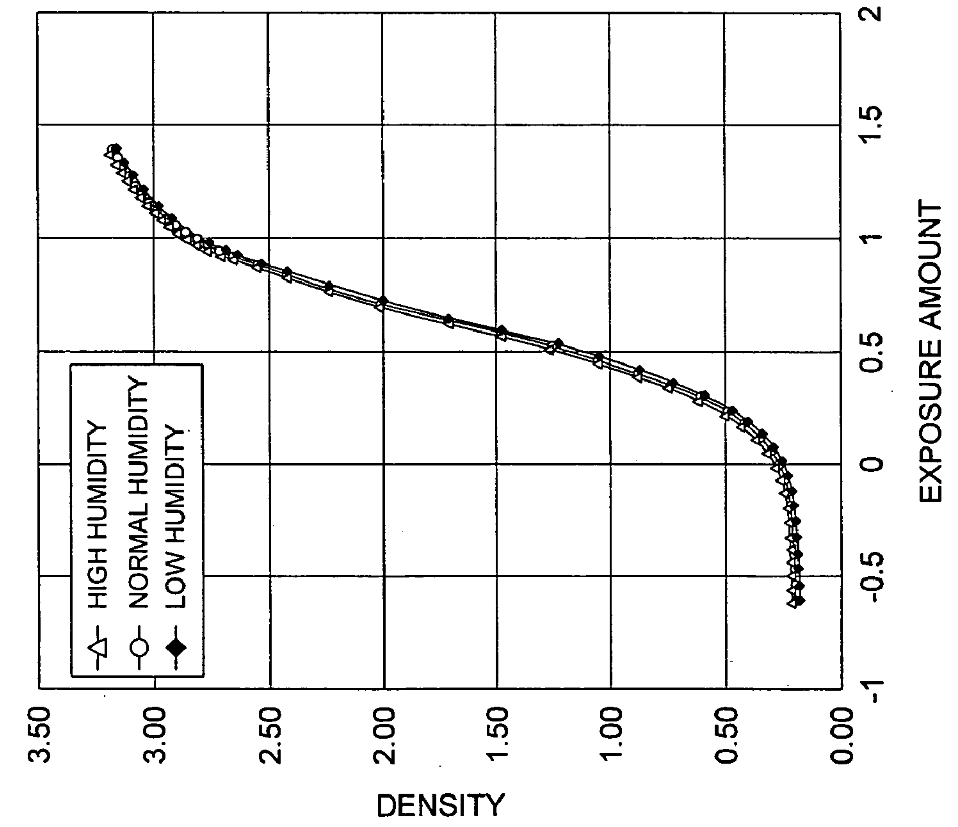

FIGS. 5(*a*) and 5(*b*) are drawings showing the sensitocurve (γ curve) indicating the relationship between the exposure amount and the density of Example 1 and Comparative Example 1 of the rapid process. FIGS. 6(*a*) and 6(*b*) are drawings showing the sensitocurve (γ curve) indicating the relationship between the exposure amount and the density of Comparative Examples 2 and 3 of the ordinary process.

As shown in FIGS. 6(*a*) and 6(*b*), in the conventional ordinary process, in both heating of the BC surface and heating of the EC surface, regardless of normal humidity, high humidity, and low humidity, so great difference did not appear in the absolute density/sensito curve.

On the other hand, as shown in FIGS. 5(*a*) and 5(*b*), when the rapid process was performed, in heating of the EC surface of Comparative Example 1, the sensitocurve was changed considerably between normal humidity, high humidity, and low humidity, while in heating of the BC surface of Example 1, the sensitocurve was not changed so much and was varied only to the degree of Comparative Example 3, thereby could be maintained similarly to the conventional ordinary process. The reason is considered to be that the EC surface is opened and the BC surface is heated, thus the residual solvents (moisture, organic solvent, etc.) contained in the film which are heated and intended to volatilize (evaporate) are mostly scattered off at the shortest distance, so that even if the heating time (volatilization time) is shortened, the film is hardly affected by the shortened time. Furthermore, also in the cooling system, the EC surface of the film is opened to air, so that moisture is not trapped, and the solvents are volatilized for a longer period of time, thus it is considered that the film is hardly affected by the shortened time.

Example 2

Next, in Example 2, the gap (slit) heating effect in the temperature retaining section will be explained. In this embodiment, the heat developing apparatus shown in FIG. 7 was used in the experimentation. In the heat developing apparatus, in FIG. 4, the heating plate was used as a first heating plate in the upstream side of the heating system, and a second heating plate was used in the downstream side of the heating system by omitting the rubber rollers and was covered with a heat insulator, thus the film passing section was formed in a slit shape, and the slit was heated. The slit interval between the third heating plate and the heat insulator was 3 mm.

Figure 7:
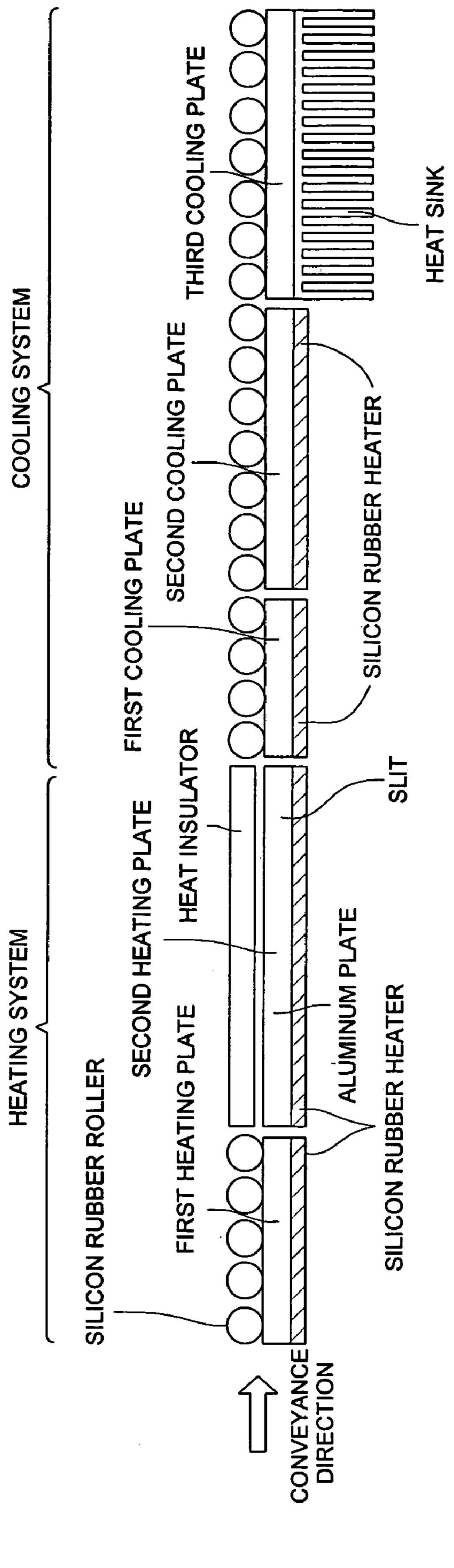
FIG. 7 is a front view showing the constitution of the main section of the heat developing apparatus used in Example 2.
Figure 8:
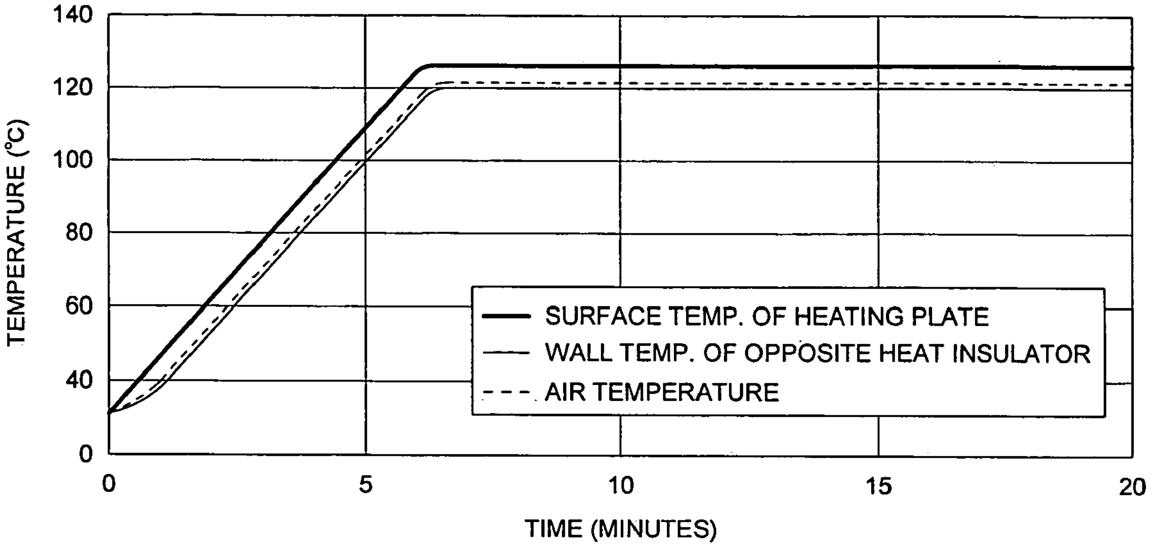
FIG. 8 is graphs showing the relationship between the time and the temperature in Example 2 when the surface temperature of the heating plate in the slit shown in FIG. 7, the wall temperature of the heat insulator opposite to the surface of the heating plate, and the air temperature in the slit are measured from the start of temperature rise up to the heat developing temperature.

The surface temperature of the heating plate in the slit shown in FIG. 7, the wall temperature of the heat insulator opposite to the heating plate surface, and the air temperature in the slit were measured from start of temperature rise up to the heat developing temperature, and the relationship between the time and the temperature is shown in FIG. 8.

Figure 9:
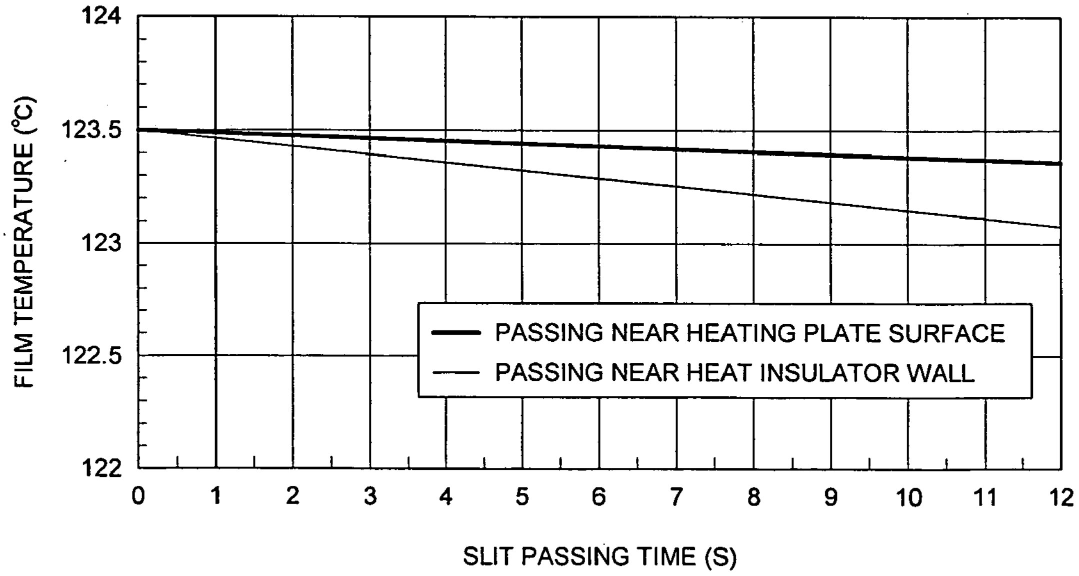
FIG. 9 is graphs showing changes in the film temperature in Example 2 when a film passes near the heating plate surface in the slit and passes near the wall surface of the heat insulator.

FIG. 9 shows changes in the film temperature when the film passes near the heating plate surface in the slit and passes near the wall surface of the heat insulator.

As shown in FIG. 8, after the film temperature reaches the heat developing temperature, the wall temperature of the heat insulator and the air temperature in the slit are almost fixed and almost coincide with each other and are lower than the surface temperature of the heating plate by about 3° C.

As shown in FIG. 9, when the slit interval is 3 mm or less and the temperature retaining time is 8 seconds or less, if the film passes near the heating plate surface in the slit, the film temperature is slightly lowered from the development temperature 123° C., and if the film passes near the wall surface of the heat insulator, the film temperature is lowered than that when the film passes near the heating plate surface, however both film temperatures differ from the set development temperature (123° C.) by less than 0.5° C. and the differences are within the range that the effect on the density can be ignored. Therefore, the slit interval of the temperature retaining section can be set to 3 mm or less, and the tolerances to curvature errors when both guides are manufactured and the mounting precision are increased, and as a result, the degree of freedom of design is increased greatly.

Figure 10:
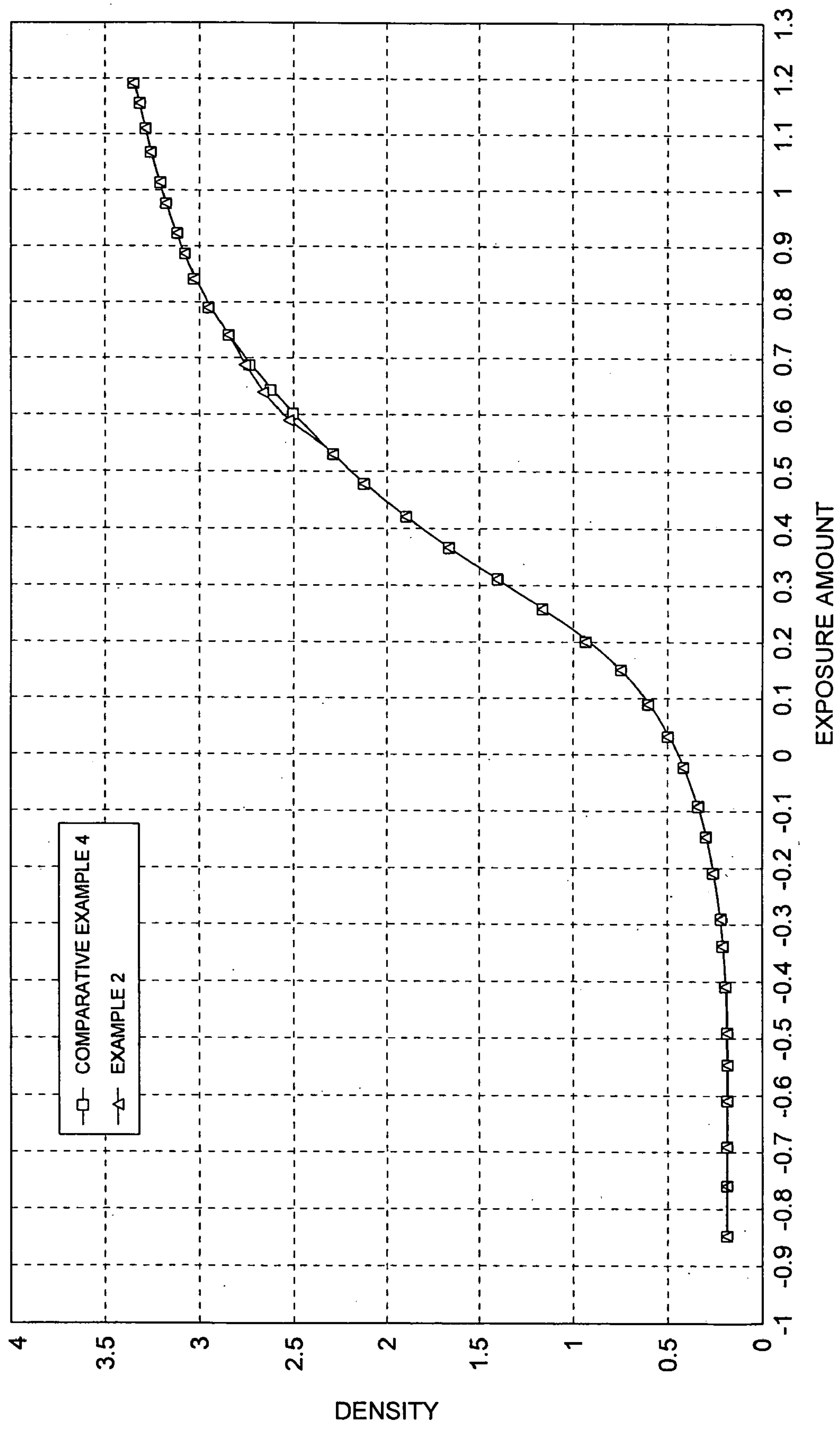
FIG. 10 is a drawing showing the sensitocurve (γ curve) indicating the relationship between the exposure amount and the density obtained in Example 2 and Comparative Example 4.
Figure 11:
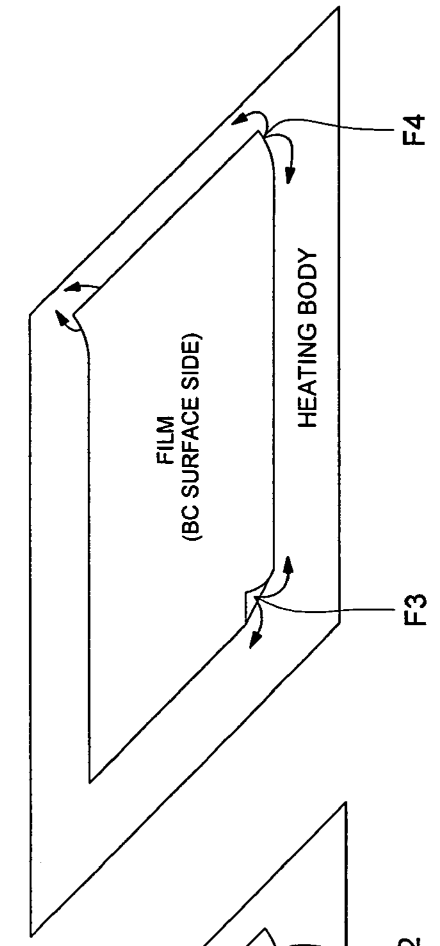
FIG. 11(*a*) is a drawing schematically showing the situation of opening of the EC side (opening of the EC surface) of the sheet film to air and heating of the BC side (heating of the BC surface).
Figure 11:
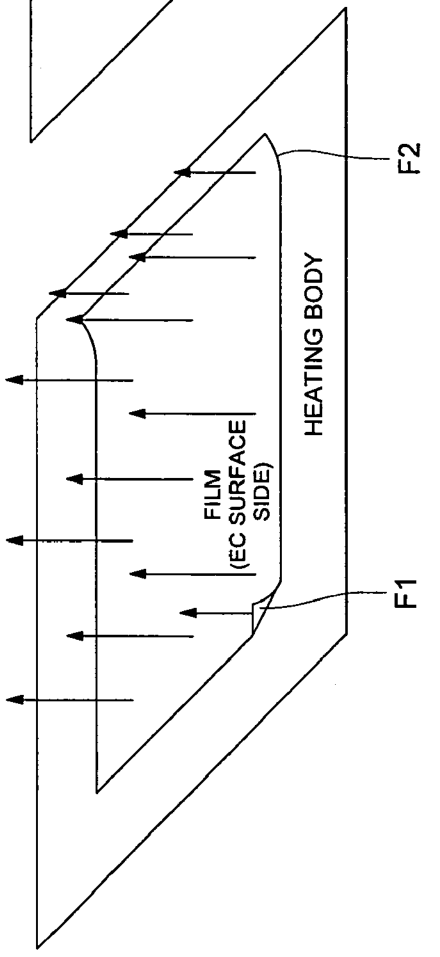

In Example 2, the heat developing process was executed using the heat developing apparatus shown in FIG. 7. The sensitocurve (γ curve) indicating the relationship between the exposure amount and the density obtained at that time is shown in FIG. 10. Further, in Comparative Example 4, the heat developing process is executed under the same condition as that of Example 2 except use of the heat developing apparatus shown in FIG. 4 and the sensitocurve (γ curve) indicating the relationship between the exposure amount and the density obtained at that time is also shown in FIG. 10.

As shown in FIG. 10, after the film temperature reaches the heat developing temperature, when a case that the film is adhered to the heating plate surface by the opposing rollers and is heated (Comparative Example 4) and a case that the film is heated in the slit (Example 2) are compared, there is little difference in the sensitocurve and almost the same results can be obtained.

The preferred embodiments of the present invention are explained above. However, the present invention is not limited to these embodiments and can be modified variously within the scope of technical thought. For example, in the embodiments, when producing films, a solvent of organic solvent type is used, though an aqueous solvent can be used. Heat developing films using an aqueous solvent are produced as indicated below.

Namely, a PET film is coated with an organic silver salt containing layer using a coating solution containing water of 30 wt % or more of the solvent, is dried, and formed, and a heat developing photosensitive film with a thickness of 200 μm is produced. The binder of the organic silver salt containing layer can be dissolved or dispersed in a aqueous solvent (water solvent) and is composed of latex of a polymer having an equilibrium moisture content of 2 wt % or less at 25° C. and 60% RH. The aqueous solvent composed of the polymer which can be dissolved or scattered is water or water mixed with a water-miscible organic solvent of 70 wt % or less. As a water-miscible organic solvent, for example, alcohols such as methyl alcohol, ethyl alcohol, and propyl alcohol, the Cellosolves such as methyl Cellosolve, ethyl Cellosolve, and butyl Cellosolve, and ethyl acetate and dimethylformamide may be cited.

Specifically, the emulsion layer (photosensitive layer) coating solution is prepared as indicated below. To a fatty acid silver dispersion of 1000 g and water of 276 ml, a pigment-1 dispersion, an organic polyhalogen compound-1 dispersion, an organic polyhalogen compound-2 dispersion, a phthalazine compound-1 solvent, an SBR latex (Tg, 17° C.) liquid, a reducing agent-1 dispersion, a reducing agent-2 dispersion, a hydrogen bonding compound-1 dispersion, a development promoter-1 dispersion, a development promoter-2 dispersion, a color adjusting agent-1 dispersion, a mercapto-compound-1 water solution, and a mercapto compound-2 water solution are added sequentially, and a silver halide mixed emulsion is added immediately before coating, and the emulsion layer coating solution obtained by sufficiently mixing them is sent straight to the coating die and is coated.

What is claimed is:

1. A heat developing apparatus which heat-develops a sheet film with a heat developing photosensitive material coated on one side of a supporting substrate, the heat developing apparatus comprising:

a heating device to heat the sheet film so that a heating time is 10 seconds or less, which comprises a temperature raising section and a temperature retaining section;

a cooling device to cool the sheet film subsequently to a heating step of the heating device, wherein the heating device heats the sheet film from a supporting substrate surface side and wherein, at least in the temperature retaining section, a side of a surface of the sheet film on which the heat developing photosensitive material is coated is open to air so that volatilized solvents from the photosensitive material are not trapped.

2. The heat developing apparatus of claim 1, wherein the heating device is structured to carry out:

a temperature raising process to raise a temperature of the sheet film up to a heat developing temperature; and a temperature retaining process to maintain the temperature of the sheet film which has been raised up to the heat developing temperature.

3. The heat developing apparatus of claim 1, wherein the heating device includes:

a first zone structured of a first stationary guide including a heater and an opposing roller pressing the sheet film on the first stationary guide; and a second zone structured of a second stationary guide including a heater and another guide maintaining a predetermined guide gap between the second stationary guide and the another guide, and wherein the predetermined guide gap in the second zone is 3 mm or less.

4. The heat developing apparatus of claim 3, wherein the guide gap in the second zone is within a range of 1 to 3 mm.

5. The heat developing apparatus of claim 3, wherein the second stationary guide and the another guide in the second zone have approximately the same curvatures.

* * * * *